United States Patent
Schuttenberg et al.

(10) Patent No.: US 9,367,456 B1
(45) Date of Patent: Jun. 14, 2016

(54) INTEGRATED CIRCUIT AND METHOD FOR ACCESSING SEGMENTS OF A CACHE LINE IN ARRAYS OF STORAGE ELEMENTS OF A FOLDED CACHE

(71) Applicant: Marvell International LTD., Hamilton (BM)

(72) Inventors: Kim Schuttenberg, Gilbert, AZ (US); Richard Bryant, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 178 days.

(21) Appl. No.: 14/288,739

(22) Filed: May 28, 2014

Related U.S. Application Data (60) Provisional application No. 61/835,073, filed on Jun. 14, 2013.

(51) Int. Cl.
*G06F 12/00* (2006.01)
*G06F 12/08* (2016.01)

(52) U.S. Cl.
CPC ........ *G06F 12/0811* (2013.01); *G06F 12/0815* (2013.01); *G06F 12/0864* (2013.01); *G06F 12/0866* (2013.01); *G06F 12/0897* (2013.01)

(58) Field of Classification Search
CPC . G06F 12/0864; G06F 12/123; G06F 12/126; G06F 12/0862; G06F 12/897; G06F 12/0866; G06F 3/0697; G06F 12/0811; G06F 12/0897; G06F 12/0815
USPC ................................ 711/128, 124, 129, 162
See application file for complete search history.

(56) References Cited

U.S. PATENT DOCUMENTS

| | | | | |
|---|---|---|---|---|
| 2008/0114940 A1* | 5/2008 | Ito | ........................ | G06F 12/0864 711/128 |
| 2010/0064205 A1* | 3/2010 | Moyer | ................ | G06F 11/1064 714/800 |
| 2012/0246408 A1* | 9/2012 | Yamamura | .......... | G06F 12/0895 711/125 |
| 2014/0082284 A1* | 3/2014 | Abella Ferrer | ...... | G06F 12/0864 711/119 |

* cited by examiner

*Primary Examiner* — Hong Kim (57) ABSTRACT

An integrated circuit including a cache and first and second modules. The cache is folded a predetermined number of times. The cache includes arrays and storage elements. Each of the arrays includes respective ones of the storage elements. The arrays store a cache line. The cache line includes segments of data. The segments of data are stored in two or more of the arrays. Each of the segments of data is stored in a corresponding one of the storage elements. The first module receives a first identifier of one of the segments of data and a second identifier of a set of the storage elements. The first module determines an index based on the first and second identifiers. The second module, based on the index, accesses one of the segments of data from the two or more of the arrays and outputs the one of the segments of data.

20 Claims, 8 Drawing Sheets

ND METHOD FOR
INTEGRATED CIRCUIT AND METHOD FOR ACCESSING SEGMENTS OF A CACHE LINE IN ARRAYS OF STORAGE ELEMENTS OF A FOLDED CACHE

CROSS-REFERENCE TO RELATED APPLICATIONS

This application claims the benefit of U.S. Provisional Application No. 61/835,073, filed on Jun. 14, 2013. The entire disclosure of the application referenced above is incorporated herein by reference.

FIELD

The present disclosure relates to cache, and more particularly to systems for accessing cache lines in a cache.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A device, such as a computer, a mobile phone, a tablet, etc., can include a processor, cache memory and nonvolatile memory. The processor may include the cache memory or alternatively the cache memory may be arranged in close proximity to the processor. The cache memory can include one or more of a level zero (L0) cache, a level one (L1) cache, a level two (L2) cache, or a level three (L3) cache. Close arrangement of the cache memory to the processor provides quick access to data stored in the cache memory. Data stored in the cache memory can also be stored in the other storage devices. The nonvolatile memory can include random access memory (RAM), solid-state memory, a storage drive, a hard disk drive, etc.

The cache memory can be used to temporarily store a copy or a version of data stored in the nonvolatile memory. Due to the close proximity of the cache to the processor, the processor is able to more quickly access the data stored in the cache as opposed to the corresponding data stored in the nonvolatile memory.

Figure 1:
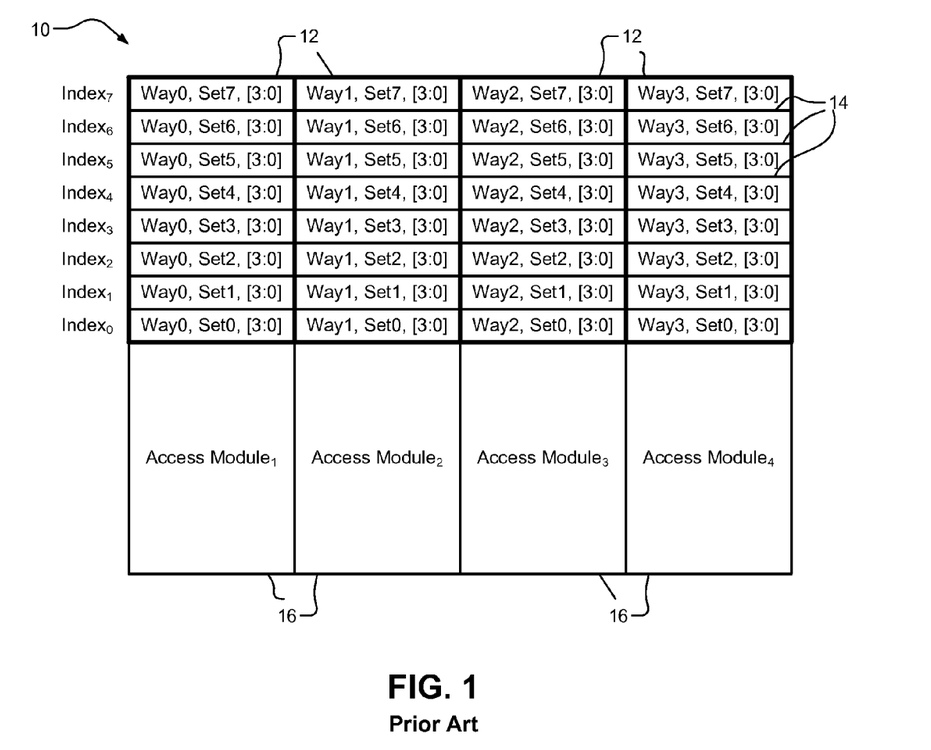
FIG. 1 is a functional block diagram of a portion of a traditional cache.

FIG. 1 shows a portion 10 of a cache including multiple arrays 12 of storage elements 14 storing respective cache lines, and data access modules 16. The storage elements 14 include "cache lines". Each cache line can refer to a contiguous range of memory locations. Each of the cache lines is included in a corresponding one of the arrays 12, has a corresponding index, and can store multiple segments of data. Each of the segments can include a predetermined number of bits, bytes and/or words of data. In the example shown, each cache line includes 4 words [3:0]. Each word is one segment of the corresponding cache line.

The cache lines are grouped into sets of storage elements (hereinafter referred to as "sets") and ways of storage elements (hereinafter referred to as "ways"). The sets are identified by respective indices. Data stored in a cache line and corresponding to a particular range of cache line addresses can only be stored in a particular set, but may be stored in any one of the ways. Each of the sets refers to possible locations in a cache where certain data bits can be stored. Each of the ways refers to storage elements of a particular array and includes a storage element in each of the sets. For the example shown, the cache is a 4-way/8-set cache.

The data access modules 16 of each array accesses data stored in the corresponding way. Each of the data access modules 16 includes sense amplifiers and/or write drivers. The sense amplifiers and write drivers of an array access corresponding storage elements of that array. The storage elements of an array are not accessed in parallel. The storage elements of multiple arrays can be accessed in parallel.

Sizes of the cache lines can be optimized for access efficiency purposes. As an example, addresses and/or states of each cache line can be tracked. To store the tracked addresses and/or states of the cache lines, in addition to the corresponding data, sizes of the cache lines can be increased. Each cache line may store one or more addresses and states of that cache line. The addresses, states and data of a cache line can then be accessed from the cache line, which increases efficiency. Also, increasing sizes of the cache lines can result in more efficient transfers of data to and from a cache when spatial locality of accesses is such that cache line addresses are within a predetermined range of each other. However, the larger the cache lines of a cache, the fewer locations available to store the data and as a result the more limited is the flexibility of where the data can be stored.

SUMMARY

An integrated circuit is provided and includes a cache, a first module and a second module. The cache is folded a predetermined number of times. The cache includes arrays and storage elements. Each of the arrays includes respective ones of the storage elements. The arrays are configured to store a cache line. The cache line includes segments of data. The segments of data are stored in two or more of the arrays. Each of the segments of data is stored in a corresponding one of the storage elements. The first module is configured to receive a first identifier of one of the segments of data and a second identifier of a set of the storage elements. The first module is configured to determine an index based on the first identifier and the second identifier. The second module is configured to, based on the index, access one or more of the segments of data from the two or more of the arrays and output the one or more of the segments of data.

In other features, each of the segments of data is stored in a respective one of the storage elements. In other features, the segments of data are stored respectively in the arrays. Each of the segments of data is stored in a respective one of the storage elements. In other features, each of the segments of data is a word of data.

In other features, the integrated circuit further includes multiple modules including the second module. The modules are configured to receive data respectively from the arrays. The integrated circuit also includes a third module, a fourth module and a multiplexer. The third module is configured to compare a first tag to multiple tags and generate a signal indicating whether the first tag matches one of the multiple tags. The fourth module is configured to generate a third identifier of a way. The third identifier of the way identifies a group of the storage elements. The multiplexer is configured to select one of the modules based on the third identifier.

In other features, the integrated circuit further includes multiple modules including the second module. The first module is configured to receive multiple identifiers and a third identifier of a way. The multiple identifiers include the first identifier and not the third identifier. Each of the multiple identifiers identifies a respective one of the segments of the cache line. Each of the segments is stored in a corresponding one of the arrays. The third identifier of the way identifies a group of the storage elements. The first module is configured to determine indices based on the multiple identifiers and the third identifier. The indices include the index. The multiple modules are each configured to, based on a respective one of the indices, output a respective one of the segments of the cache line as received from a respective one of the arrays.

In other features, the integrated circuit further includes multiple modules including the second module. The first module is configured to receive multiple identifiers and a third identifier of a way. The multiple identifiers include the first identifier and not the third identifier. Each of the multiple identifiers identifies a respective one of the segments of the cache line. Each of the segments is stored in a respective one of the arrays. The third identifier of the way identifies a group of the storage elements. The first module is configured to determine indices based on the multiple identifiers and the third identifier. The indices include the index. The multiple modules are each configured to, based on a respective one of the indices, output a respective one of the segments of the cache line as received from a respective one of the arrays.

In other features, the cache includes groups. Each of the groups includes two or more of the storage elements. Each of the groups has a respective index. Each of the storage elements in one of the groups is configured to store a different segment of the cache line than other storage elements in the one of the plurality of groups.

In other features, each of the arrays is configured to store data for two or more ways. Each of the two or more ways identifies a group of the storage elements. In other features, the cache is folded once such that data stored in a first array alternates between a first way and a second way. Data stored in a second array alternates between the second way and the first way. Each index of the cache stores data for the first way and the second way.

In other features, the cache is folded twice such that: data for a way, a set and a first index is stored in a first array; data for the way, the set and a second index is stored in a second array; and data for the way, the set and a third index is stored in a third array.

In other features, the second index is sequentially after the first index and the third index is sequentially after the second index. In other features, storage elements corresponding to each way of the cache are arranged in a helical pattern.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 2:
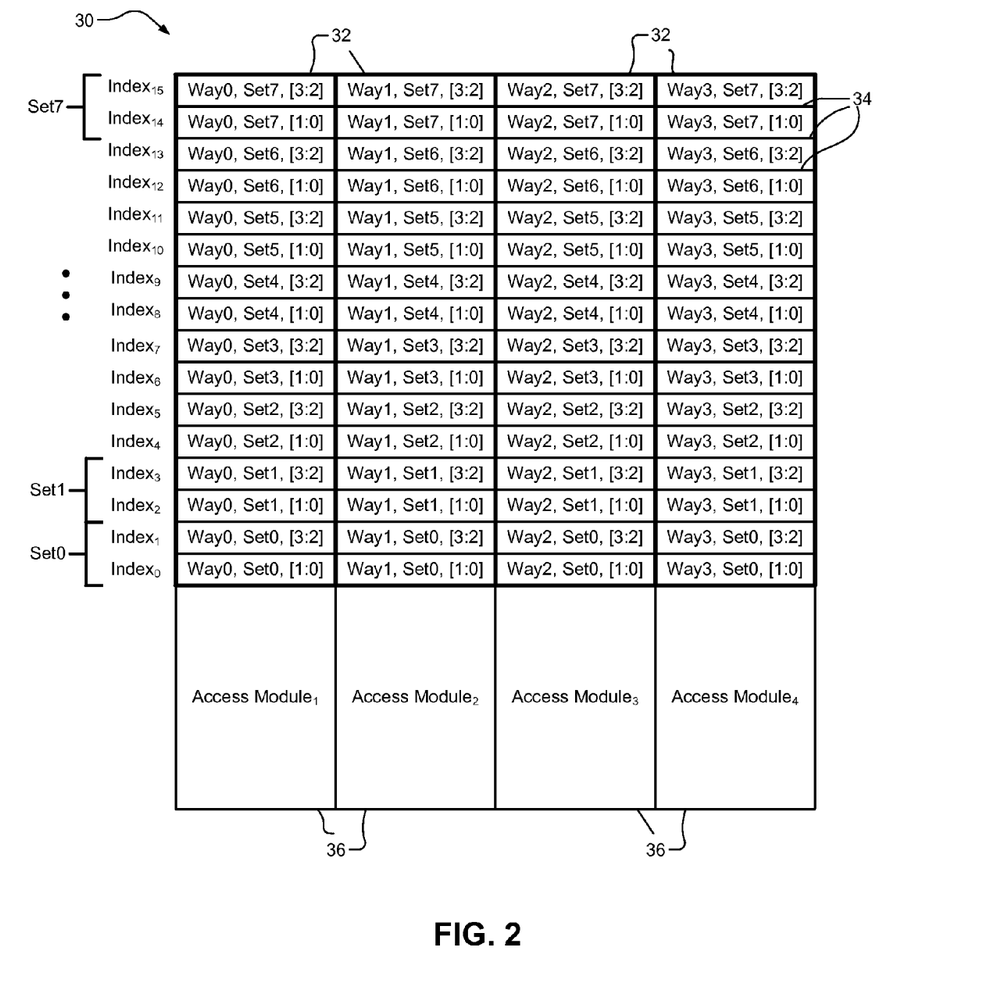
FIG. 2 is a functional block diagram of a portion of a cache with each set having two indices.

FIG. 2 shows a portion 30 of a cache including multiple arrays 32 of storage elements 34 and access modules 36. Each of the arrays 32 corresponds to a respective one of the access modules 36 and may have a predetermined width. Each of the storage elements stores respective segments of a cache line. The cache lines are grouped into sets of storage elements (hereinafter referred to as "sets") and ways of storage elements (hereinafter referred to as "ways") and refer to respective regions of the cache. Each region could be an array, a portion of an array, a chip, or other region of the cache. Each set of the cache has two indices (e.g., Set0 has $index_0$ and $index_1$). Each of the cache lines has a corresponding pair of indices and can store multiple segments, where the segments of each of the cache lines are stored in a corresponding one of the arrays 32. For example, a cache line is stored in $indices_{0-1}$ and is part of set0 and way0. Each of the segments can include a predetermined number of bits, bytes, and/or words of data. In the example shown, each of the cache lines includes 4 words. Each word is one segment of the corresponding cache line.

As an example, each of the sets may have four cache lines. Data stored in a cache line and corresponding to a particular range of addresses can only be stored in a particular set, but may be stored in any one of the ways. Each of the sets refers to possible locations (or storage elements) in the cache where certain data bits can be stored. Each of the ways refers to storage elements of a particular array and includes a storage element in each of the sets and in each of the indices. The access modules 36 of the arrays 32 access data stored in respective ways.

Figure 3:
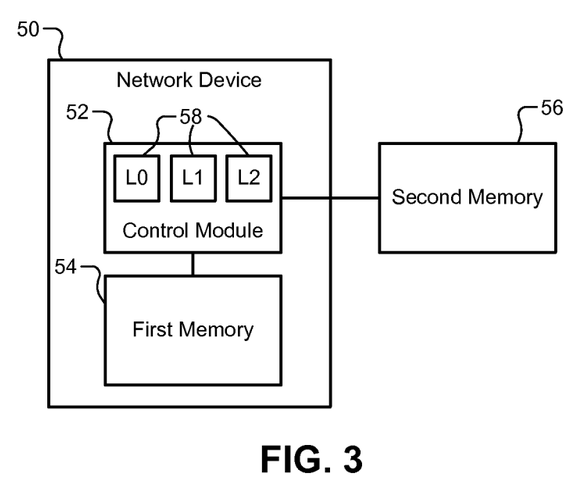
FIG. 3 is a functional block diagram of a device incorporating a cache in accordance with the present disclosure.

The storage elements of the cache can be accessed in response to fill, evict, and/or instruction (read or write) commands. The fill, evict and instructions commands may be received from a control module (an example control module is shown in FIG. 3). A fill command is a request to write data in a storage element and change a cache line address of the storage element. An evict command is a request to read data in a storage element and change a cache line address of the storage element. An instruction command is a request to read or write data to a storage element without changing a cache line address of the storage element. Fill, evict, and instruction commands can each include a cache line address. Each of the cache line addresses may include a tag. The tag includes an address of a location in the cache and a location in another memory. Certain bits of the tag may refer to the location in the cache. The memory is larger than the cache and stores a version of the data stored in the cache line and associated with the address provided by the tag. The cache line stores a copy of the data as stored in the memory.

The length of indices in instruction commands, for a cache line of a "parallel" cache, is inversely proportional to a logarithm of a size of the cache line. A parallel cache refers to a cache having storage elements that can be accessed in parallel. Thus, as the length of the indices decrease, the length of the cache line increases and circuit area usage efficiency of the corresponding array of the cache decreases. As an example, increasing length of an index by 1 bit can improve circuit area usage efficiency by 30%. Although this relationship does not exist for "serial" caches, serial caches are slower than parallel caches and are not typically suitable for low level caches (e.g., L0 cache or L1 cache). A serial cache refers to a cache having storage elements that are accessed serially. The tradeoffs between the lengths and the usage efficiencies can occur for a cache of any predetermined size. The size of a cache may be equal to a product of a line size of the cache, a number of indices per cache line, and a number of ways per cache line.

Each of the access modules 36 includes sense amplifiers and/or write drivers. The sense amplifiers and write drivers of an array access corresponding storage elements of that array. The sense amplifiers may be used to read and/or evict data from a storage element. The write drivers may be used to write data to and/or fill a storage element. The storage elements of an array are not accessed in parallel. The storage elements of different arrays can be accessed in parallel.

The arrays 32 are configured such that the amount of logic devices (e.g., sense amplifiers and write drivers) included in each of the access modules 36 may be less than and/or half the amount of logic devices included in each of the access modules 16 of FIG. 1. This is because the amount of data stored in each of the storage elements 34 of FIG. 2 is half the amount of data stored in each of the storage elements 14 of FIG. 1. For the example shown, each of the storage elements 34 stores 2 words, whereas each of the storage elements 14 of FIG. 1 stores 4 words. However, although the amount of logic devices is less, attempts to access a full cache line including accessing first segments for a first index of a set while accessing second segments for a second index of the set results in a conflict. This is because the same access module and corresponding logic devices are used to access the first segments and the second segments during the same period of time. In contrast to the data storage arrangement of FIG. 2, additional logic devices are included in each of the access modules 16 of the cache of FIG. 1 to allow parallel access to all segments of a cache line. Although the example arrangement of segments and/or data in the arrays 32 of FIG. 2 includes two indices for each set, which increases circuit area usage efficiency of the access modules 36, this arrangement prevents a whole cache line from being accessed in parallel and/or during the same period of time.

FIG. 3 shows a device 50 that includes a control module 52, a first memory 54, and a second memory 56. The device 50 may be a network device such as a computer, a mobile phone, a tablet, a personal data assistant, a server, or other device. The control module 52 may include any number of caches 58. Each of the caches 58 may be a level 0 (L0) cache, level 1 (L1) cache, or level 2 (L2) cache. The examples, the portions of cache, and the data access techniques disclosed with respect to FIGS. 4-8 may be included in and/or applied to any of the caches 58. The first memory 54 is included in the device 50 and may include level 3 (L3) cache, volatile memory, and/or non-volatile memory. The first memory 54 may include solid-state memory or other volatile and/or non-volatile memory. The second memory 56 is external to the device 50 and may include non-volatile memory. The second memory 56 may include a solid-state drive, solid-state memory, a hard disk drive, a storage drive, and/or other non-volatile memory.

Figure 4:
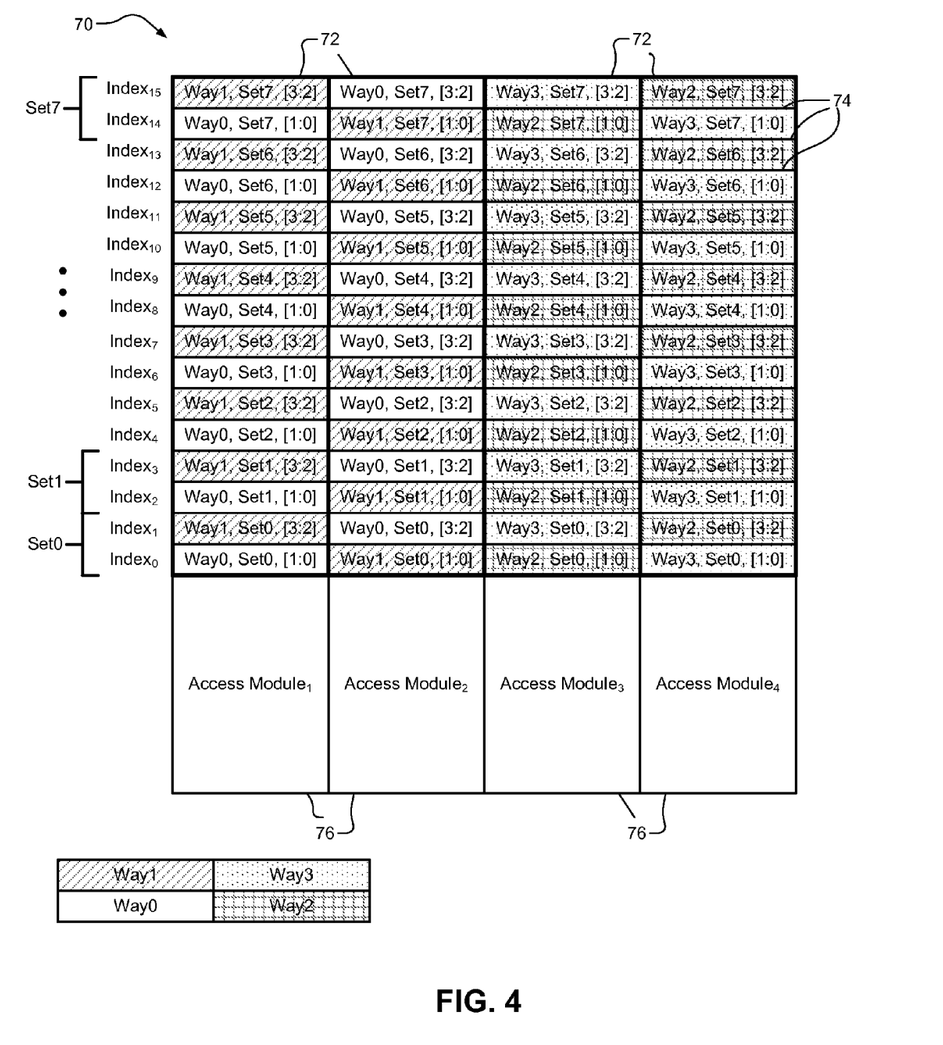
FIG. 4 is a functional block diagram of a portion of a cache illustrating a single folded example in accordance with the present disclosure.
Figure 5:
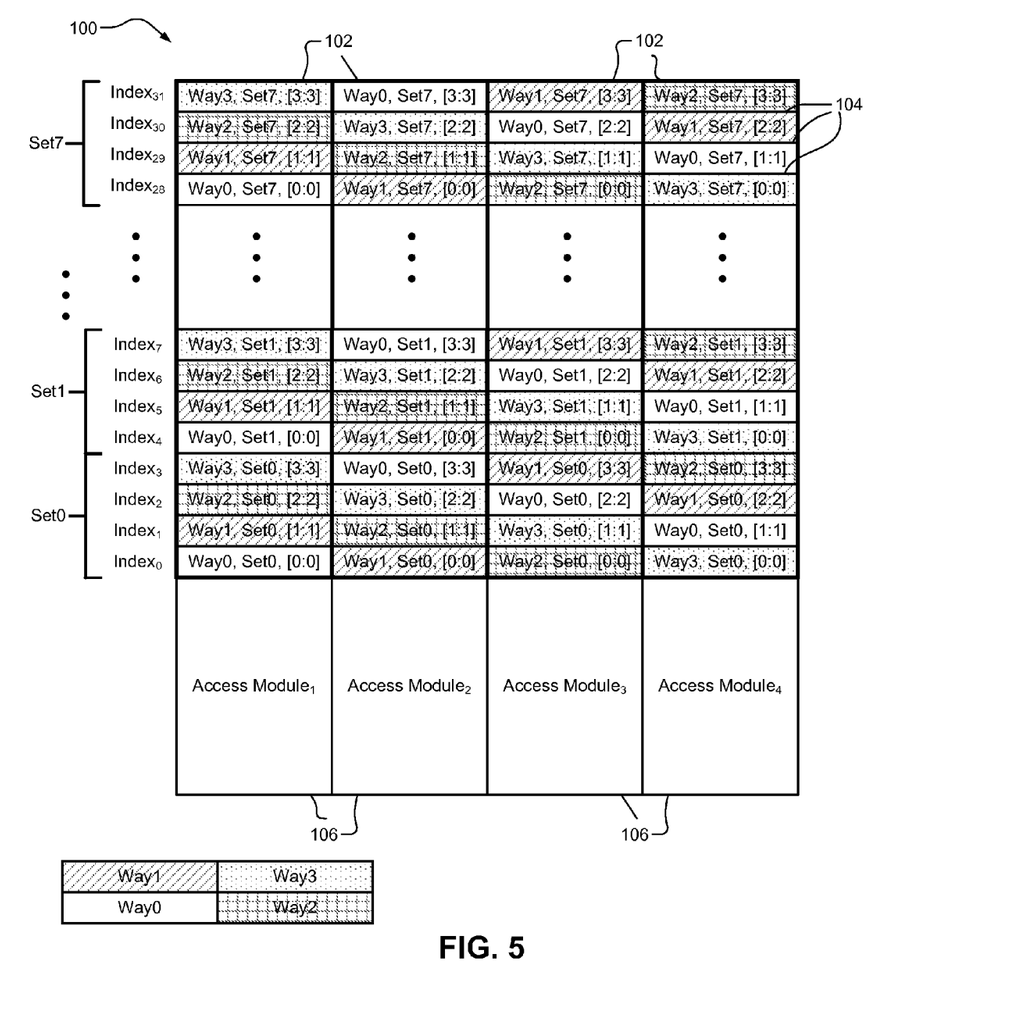
FIG. 5 is a functional block diagram of a portion of a cache illustrating a double folded example in accordance with the present disclosure.

For the following examples of FIGS. 4 and 5, although a particular number of sets, indices, ways, and segments per cache line are shown, other numbers of sets, indices, ways and segments per cache line may be included. The numbers of sets, indices, ways and segments per cache line may satisfy one or more below disclosed relationships provided for the numbers of sets, indices, ways and/or segments in a cache line. Also, although the following examples of FIGS. 4-8 are primarily described for parallel caches, the techniques of FIGS. 4-8 may be applied to serial caches.

FIG. 4 shows a portion 70 of a cache including multiple arrays 72 of storage elements 74 and access modules 76. Each of the arrays 72 corresponds to a respective one of the access modules 76 and may have a predetermined width. Although the arrays 72 are shown as columns of memory, the arrays 72 may be arranged in rows and may include one or more arrays of memory cells and/or one or more chips. Each of the storage elements 74 stores a predetermined number of segments (e.g., 2) of a cache line. The cache lines are grouped into sets and ways. Each set maps to each of the arrays 72 and/or columns of the memory cells. Each of the ways maps to two of the arrays 72 and/or two of the columns of the memory cells. In the example shown, each of the sets has two indices. Each of the cache lines has a corresponding pair of indices and can store multiple segments, where the segments of a cache line are stored in two of the arrays 72.

Each of the segments can include a predetermined number of bits, bytes, and/or words of data. In the example shown, a length of two of the segments (i.e. the number of bits or words in two of the segments) may be equal to the predetermined width (or size) of the storage elements. In the example shown, each of the cache lines includes 4 words. Each word is one segment of data stored in the cache line. Each of the sets may include four cache lines. Each of the ways refers to storage elements in two of the arrays 72 and includes a storage element in each of the sets and in each of the indices. Each cache line is stored in storage elements of a single corresponding set. The storage elements of a cache line are not in the same array and do not have the same index. For example, a cache line may have 4 segments. As shown, the first two segments may be stored in way0 and set0 of a first array having $index_0$. The second two segments may be stored in way0 and set0 of a second array having $index_1$.

The cache of FIG. 4 is referred to as being "folded once" because: data stored in a first array alternates between a first way (way0) and a second way (way1); data stored in a second array alternates between the second way and the first way; and each index of the cache stores data for the first way and the second way. Also, in the example that includes 4 ways: data stored in a third array alternates between a third way (way2) and a fourth way (way3); data stored in a fourth array alternates between the fourth way and the third way; and each index of the cache stores data for the third way and the fourth way.

The access modules 76 of each of the arrays 72 accesses data stored in the corresponding way. The storage elements 74 may be accessed in response to fill, evict, and/or instruction (read or write) commands. Each of the access modules 76 includes sense amplifiers and/or write drivers to execute the commands. The sense amplifiers and write drivers of each of the arrays 72 accesses corresponding storage elements. The amount of logic devices included in each of the access modules 76 may be the same as the amount of logic devices provided in each of the access modules 36 of FIG. 2, which is less than the amount of the logic devices provided in each of the access modules 16 of FIG. 1.

The sense amplifiers of the access modules 76 allow the storage elements of different arrays and of different indices to be accessed in parallel. This allows the data and/or segments of a cache line that is stored in different storage elements to be accessed in parallel. A full cache line of data may be accessed, for example, when a way identifier (ID) of the cache line is known prior to access of the data in the cache line. A way ID may be known prior to accessing the data in the way and/or the cache line, for example, when a fill command, an evict command and/or an instruction command is being executed. For example a control module may generate a command to replace data in a cache line. The command may indicate in which way of a cache to write updated and/or replacement data for one or more segments of the cache line.

Although shown as columns, the arrays 72 may not be arranged in columns. Also, although shown as rows, the storage elements of each of the indices may not be arranged in the same row. In addition, although the arrays 72 may include columns of memory cells, each of the arrays 72 may include memory cells that are not in the same column. Also, although the indices may refer to rows of memory cells, each of the indices may refer to memory cells that are not in the same row.

FIG. 5 shows a portion 100 of a cache including multiple arrays 102 of storage elements 104 and access modules 106. Each of the arrays 102 corresponds to a respective one of the access modules 106 and may have a predetermined width. Although the arrays 102 are shown as columns of memory, the arrays 102 may be arranged in rows and may include one or more arrays of memory cells and/or one or more chips. Each of the storage elements 104 stores a predetermined number of segments (e.g., 1) of a cache line. The cache lines are grouped into sets and ways. Each set maps to each of the arrays 102 and/or columns of memory cells. Each of the ways maps to each of the arrays 102 and/or to each of the columns of memory cells.

In the example shown, each of the sets has four indices. Each of the cache lines has 4 corresponding indices and can store multiple segments, where the segments of a cache line are stored in four of the arrays 102. Each of the segments can include a predetermined number of bits, bytes and/or words of data. The predetermined number of bits, bytes, and/or words may be equal to the predetermined width of the storage elements. In the example shown, each cache line includes 4 words. Each word is one segment of data stored in the cache line. Each cache line is stored in storage elements of a single corresponding set. Each of the sets may include four cache lines. Each of the ways refers to storage elements in four of the arrays and includes a storage element in each of the sets and in each of the indices. The storage elements of a cache line are not in the same array and do not have the same index. For example, a cache line may have 4 segments.

As shown, each of the segments may be stored in different arrays and have a different index. As an example, a first segment of a particular cache line is stored in a first array, way0, and set0 and has $index_0$. The second segment of data stored in the cache line is stored in a fourth array, way0, and set0 and has $index_1$. The third segment of data stored in the cache line is stored in a third array, way0, and set0 and has $index_2$. The fourth segment of data stored in the cache line is stored in a second array, way0, and set0 and has $index_3$.

The cache of FIG. 5 is referred to as being "folded twice" because: data for a particular way, a particular set and a first index is stored in a first array; data for the way, the set and a second index is stored in a second array; and data for the way, the set and a third index is stored in a third array. Data for the way, the set and a fourth index may be stored in a fourth array. The second index is sequentially after the first index. The third index is sequentially after the second index. The fourth index is sequentially after the third index. In the example shown, the storage elements corresponding to each way of the cache are arranged in a step and/or helical pattern such that (i) each subsequent segment of a cache line is located one array and one index over from an adjacent and prior segment of the cache line, and (ii) no two segments are in the same array and/or has the same index.

Although the caches of FIGS. 4-5 are primarily described as being folded a particular number of times, the caches may be folded any number of times. The amount of folding may be based on an access size, size of a storage element, and/or length of a segment of a cache line. The amount of folding may be less than or equal to twice an access size, a size of a storage element, and/or a length of a segment of a cache line. For example, a storage element may be sized to store 1 word. As a result, the amount of folding may be less than or equal to 2.

The access modules 106 of each of the arrays 102 accesses data stored in the corresponding way of storage elements. The storage elements of a cache can be accessed in response to fill, evict, and/or instruction (read or write) commands. Each of the access modules 106 includes sense amplifiers and/or write drivers. The sense amplifiers and write drivers of each of the arrays 102 accesses corresponding storage elements. The storage elements of different arrays and of different indices can be accessed in parallel. This allows the data and/or segments of a cache line that are stored in different storage elements to be accessed in parallel. The full cache line of data may be accessed, for example, when a way identifier (ID) of the cache line is known prior to access of the data in the cache line. The amount of logic devices included in each of the access modules 106 may be less than and/or half of the amount of logic devices provided in each of the access modules 76 of FIG. 2. The reduced number of logic devices further decreases the circuit area associated with the access modules 106.

Although shown as columns, the arrays 102 may not be arranged in columns. Also, although shown as rows, the storage elements of each of the indices may not be arranged in the same row. In addition, although the arrays 102 may include columns of memory cells, each of the arrays 102 may include memory cells that are not in the same column. Also, although the indices may refer to rows of memory cells, each of the indices may refer to memory cells that are not in the same row.

The caches of FIGS. 4 and 5 may be configured such that, when accessing a cache line, data may be accessed from all ways in parallel. This can be accomplished prior to a way ID for the cache line is known. This is unlike a serial cache in which the access occurs after the way ID is known.

The above-disclosed examples of FIGS. 4-5 provide novel arrangements of segments and/or data of cache lines within arrays of a cache. This provides benefits of large cache lines, while maintaining large index sizes and while providing parallel cache access performance. The benefits are achieved by treating commands to access a cache as if the cache had smaller cache lines. This includes accessing segments of a full cache line in parallel. The segments are read from, written to, used to fill, or evicted from the cache such that the full cache line is accessed during a same period of time. This may be achieved when the way ID of the cache line is known prior to accessing the way of the cache line (referred to as being known "ahead of time"). For fill and evict commands, the way ID of a cache line is typically known ahead of time. The way ID may not be known ahead of time for instruction commands.

The parallel access provided by the arrangements of FIGS. 4-5 is not possible with the arrangements of FIGS. 1-2, unless additional read ports and corresponding sense amplifiers, write drivers and/or other associated logic devices are added. The additional read ports results in more circuit area being used for access modules and as a result decreased circuit area usage efficiency.

A ratio of the number of sets to the number of indices of a cache may be referred to as the degree of folding. For example, the degree of folding for the arrangement of FIG. 4 is equal to the ratio of the number of sets (e.g., 8) to the number of indices (e.g., 16) or 1:2. As another example, the degree of folding for the arrangement of FIG. 5 is equal to the ratio of the number of sets (e.g., 8) to the number of indices (e.g., 32) or 1:4.

Various different mappings for arranging data of a cache line may be used to avoid parallel access conflicts, the arrangements of FIGS. 4-5 demonstrate storing the segments of a cache line in different ways and indices, and the arrangement of FIG. 5 demonstrates storing the segments of a cache line such that each of the segments is in a respective way and has a respective index. Other arrangements may be used, as long as no two segments of a cache line are in the same array and no two segments of a cache line have a same index.

Figure 6:
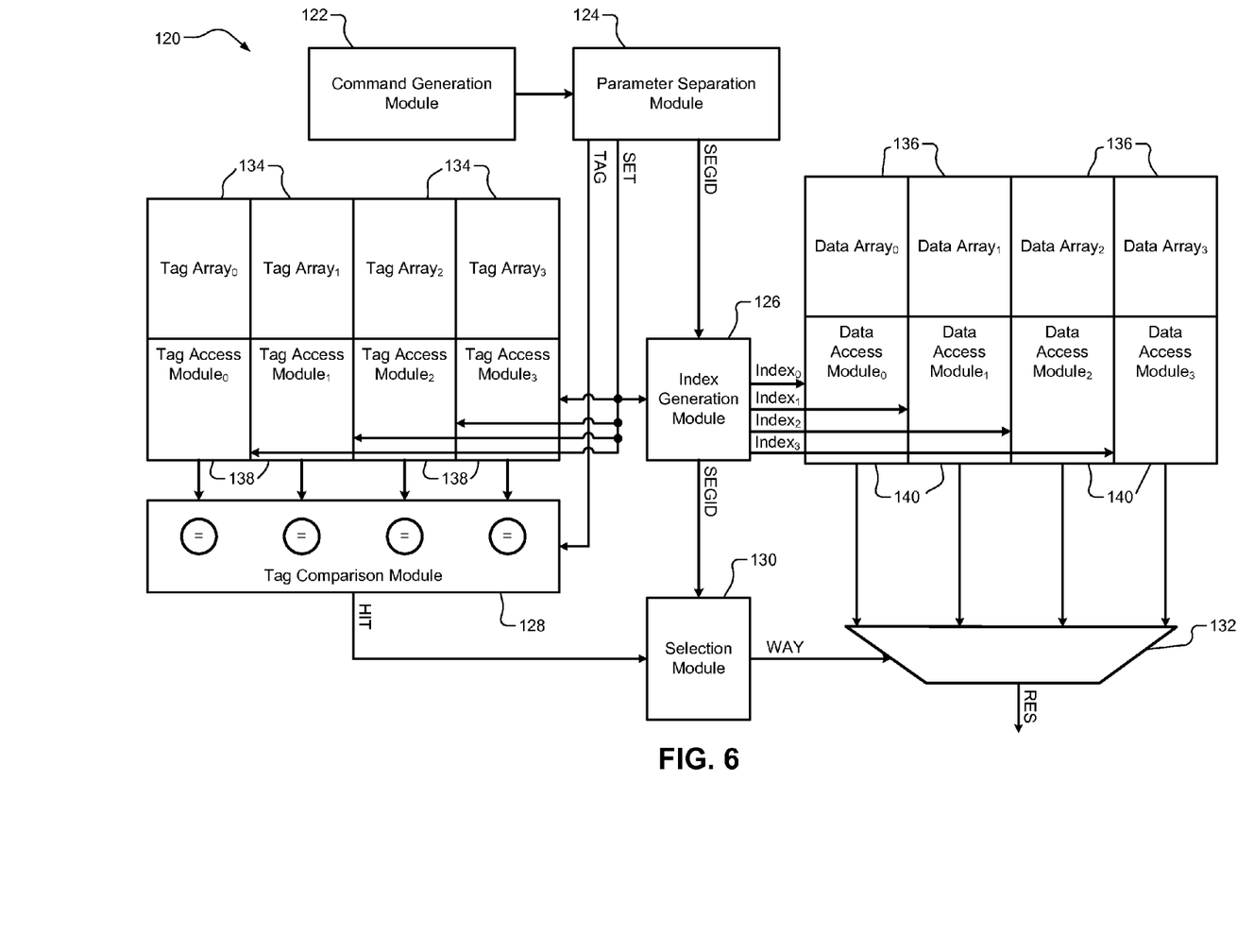
FIG. 6 is a functional block diagram of a portion of a device illustrating data access without a previously known way identifier in accordance with the present disclosure.

FIG. 6 shows a portion 120 of a device illustrating data access without a previously known way ID. The device may be the device 50 of FIG. 3 and may include a command generation module 122 and a parameter separation module 124, which may both be located in for example the control module 52. The command generation module 122 generates commands, such as fill commands, evict commands and/or instruction commands and may include the parameter separation module 124. The parameter separation module 124, if included, separates parameters from the commands. The parameter separation module 124 may separate a cache line segment IDs, a set IDs, and tags from the command. A cache line segment ID signal having one or more cache line segment IDs is shown and identified as SEGID. A set ID signal having one or more set IDs is shown and identified as SET. A tag signal having one or more tags is shown and identified as TAG.

The device also includes a cache, which may include one or more types of arrays, access modules, an index generation module 126, a tag comparison module 128, a selection module 130 and a multiplexer 132. In the example shown, the cache includes tag arrays 134 and data arrays 136. The tag arrays 134 store tags. The data arrays 136 store data corresponding to the tags. Although in the example of FIG. 6 two types of arrays (tag arrays and data arrays) are shown and the arrays are separate from each other with respective access modules, the tags arrays may be combined with the data arrays to provide one type of array (referred to as a compound array). For example, compound arrays may be used to store both the tags and the data stored in the tag arrays 134 and the data arrays 136. Each of the tag arrays 134 may be combined with a respective one of the data arrays 136.

The tag arrays 134 have respective tag access modules 138, which access the tags stored in the tag arrays 134 based on the set IDs received from the parameter separation module 124. The data arrays 136 have respective data access modules 140, which access the data stored in the data arrays 136 based on one or more outputs of the index generation module 126. The data arrays 136 may be in the arrangement of the data arrays 72 of FIG. 4, in the arrangement of the data arrays 102 of FIG. 5, or in another arrangement.

The index generation module 126 determines one or more indices of the data arrays 136 based on the cache line segment IDs and the set IDs received from the parameter separation module 124. The one or more indices are provided to the data access modules 140 for access to data stored in the data arrays 136 and corresponding to the one or more indices. As an example and during a single access event, the same index may be provided to each of the data access modules 140.

The tag comparison module 128 compares the tag received from the parameter separation module 124 to tags received from the tag access modules 138. A match signal HIT is generated based on whether the tag received from the parameter separation module 124 matches one of the tags received from the tag access modules 138. The match signal HIT may, for example, be a '1' if there is a match or a '0' if there is not a match.

The selection module 130 generates way IDs based on the cache line segment IDs and the match signal HIT. The multiplexer 132 receives outputs of the data access modules 140 and selects outputs from the data access modules 140 based on the way IDs. Operations of the index generation module 126, the tag comparison module 128, the selection module 130 and the multiplexer 132 are further described below with respect to FIG. 8.

Figure 7:
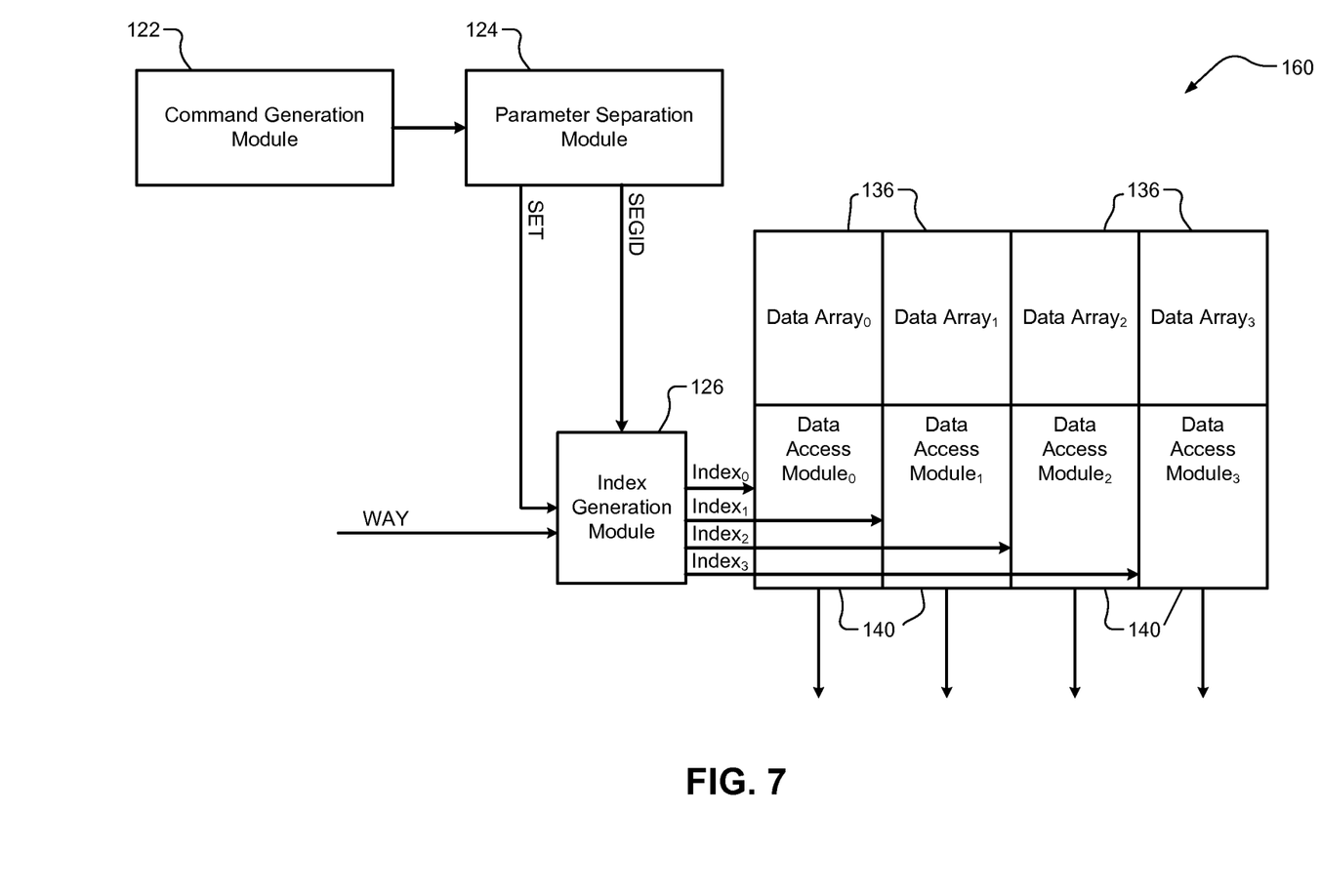
FIG. 7 is a functional block diagram of a portion of a device illustrating data access with a previously known way identifier in accordance with the present disclosure.

FIG. 7 shows a portion 160 of a device illustrating data access with a previously known way ID. The device may be the device of FIG. 3 and may include the command generation module 122 and the parameter separation module 124, which may be located in for example the control module 52 of FIG. 3. The parameter separation module 124, if included, separates parameters provided in the commands. The parameter separation module 124 may separate cache line segment IDs and set IDs from the commands. A cache line segment ID signal having one or more cache line segment IDs is shown and identified as SEGID. A set ID signal having one or more set IDs is shown and identified as SET. The parameter separation module 124 may receive more than one cache line segment ID per command or may receive a series of commands that have the cache line segment IDs for the segments of a single cache line.

The device also includes a cache, which may include the data arrays 136, the data access modules 140, and the index generation module 126. The index generation module 126 generates one or more indices based on the cache line segment IDs, the set IDs, and way IDs. A way signal, including the way IDs, is shown and identified as WAY. The way IDs may be provided in the commands, separated from the commands via the parameter separation module 124, and/or provided separate from the commands, as shown. The command generation module 122 may provide the way IDs to the index generation module 126. The one or more indices are provided to the data access modules 140. As an example, the index generation module 126 may generate a different index for each segment of a cache line based respectively on cache line segment IDs received from the parameter separation module 124. The indices may be provided respectively to the data access modules 140 such that the data access modules 140 are each accessing a different segment of the cache line. The segments may be output from the data access modules 140 in parallel and/or during the same period of time.

Figure 8:
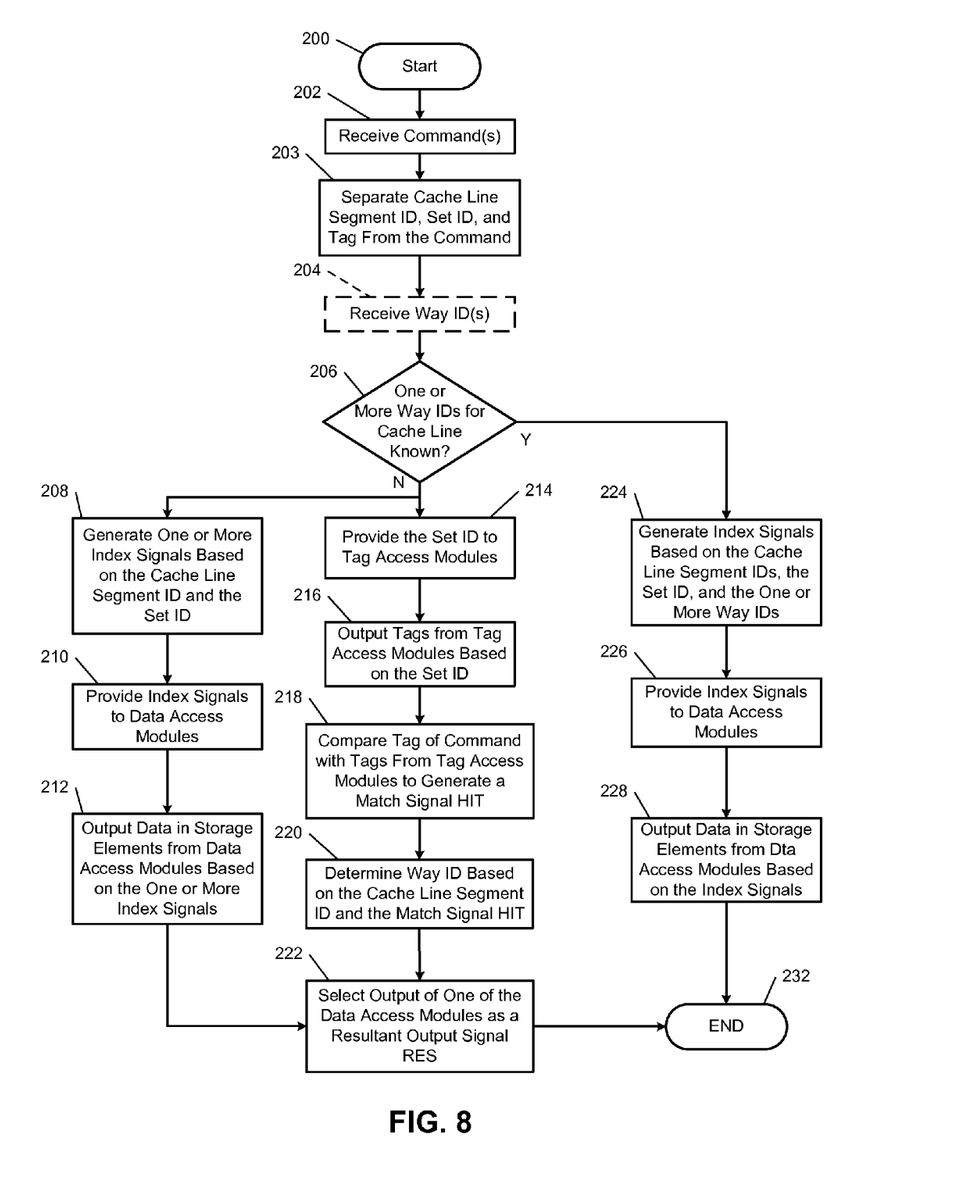
FIG. 8 illustrates a method of accessing storage elements of a cache line in accordance with the present disclosure.

The systems disclosed herein may be operated using numerous methods, an example method is illustrated in FIG. 8. In FIG. 8, a method of accessing storage elements of a cache line is shown. Although the following tasks are primarily described with respect to the implementations of FIGS. 3 and 5-7, the tasks may be easily modified to apply to other implementations of the present disclosure. The tasks may be iteratively performed. The tasks may be performed by the control module 52, one or more of the caches 58, and/or the modules of FIGS. 6-7.

The method may begin at 200. At 202, the command generation module 122 generates one or more commands to access a cache line. The one or more commands may be fill, evict and/or instruction commands and include respective cache line addresses. The commands and/or the addresses may not include an index. Each of the addresses may include bits that identify where in a cache line access is to begin.

At 203, the parameter separation module 124 separates parameters from the one or more commands. This may include separating a cache line segment ID, a set ID, a tag and/or one or more way IDs from the one or more commands for the cache line being accessed. The one or more way IDs may not be separated from the one or more commands if the one or more way IDs are not provided in the one or more commands. At 204, one or more way IDs may be received at the index generation module 126 if not already received at 202. The one or more way IDs may be received from the command generation module 122.

At 206, if one or more way IDs are not previously known, such that the one or more way IDs were not received at the parameter separation module 124 and/or the index generation module 126, then tasks 208 and 214 are performed. Tasks 208-212 may be performed while tasks 214-222 are performed. If one or more way IDs are known, such that the one or more way IDs have been received at the parameter separation module 124 and/or the index generation module 126, task 224 is performed.

At 208, the index generation module 126 generates one or more index signals. Each of the index signals has a respective index. The one or more index signals are shown as $Index_{0-3}$ in FIG. 6 and are generated based on the cache line segment ID and the set ID. As an example, the index generation module 126 may determine an index based on a product of (a) the set ID, and (b) a sum of (i) a number of indices per set (or number of segments per cache line) and (ii) a way ID. To illustrate this example and referring to FIG. 5, a segment of the cache line having the cache line segment ID may be stored in one of the storage elements associated with set1. If the cache line segment ID is 3 (e.g., referring to the fourth word in the cache line) and there are 4 segments per cache line, the segment may be stored in one of the ways associated with $index_7$ (index ID (or 7)=set ID (or 1)×(the number of segments per cache line (or 4)+the cache line segment ID (or 3)). Other suitable mathematical relationships and/or techniques may be used to determine index IDs and/or generate the index signals.

At 210, the index generation module 126 may provide the index signals respectively to the data access modules 140. As an alternative the index generation module 126 may provide the same index signal to all of the data access modules 140.

At 212, the data access modules 140, based on the index signals, access the data arrays 136. If a read or an evict command is being performed, data stored in the corresponding storage elements of the data arrays 136 are read by the data access modules 140 and provided as outputs to the multiplexer 132.

At 214, the parameter separation module 124 provides the set ID to the tag access modules 138. At 216, the tag access modules 138 access the tag arrays 134 and output tags corresponding to the set ID.

At 218, the tag comparison module 128 compares the tag received from the parameter separation module 124 to each of the tags received from the tag access modules 138. If there is a match between the tag received from the parameter separation module 124 and one of the tags received from the tag access modules 138, then the match signal HIT is generated indicating that a match has been detected. If a match has not been detected the match signal HIT may indicate that no match has been detected.

At 220, the selection module 130 determines a way ID based on the cache line segment ID and the match signal HIT. The cache line segment ID may be forwarded from the parameter separation module 124 or the index generation module 126 to the selection module 130. As an example, the way ID may be set equal to (a) a difference between the match signal HIT and the cache line segment ID, modulo (b) the number of indices per set (or number of segments per cache line). For example, the match signal HIT may be equal to 1, the cache line segment ID may be 3, and the number of indices per set may be 4. As a result, the way ID may be set to 2 (i.e. (1−3)%4=2). Other suitable mathematical relationships and/or techniques may be used to determine the way ID.

At 222, the multiplexer 132, when a read or evict command is being executed, selects one of the outputs of the data access modules 140 based on the way ID. When the way ID does become known, the cache line segment ID is used to modify output of the selection module 130 to modify selection via the multiplexer 132. The multiplexer outputs data corresponding to the selected one of the outputs of the data access modules 140 as a resultant output signal RES.

For operations where the way ID is not known and/or received in advance, if the access size is limited to a product of (i) a size of a cache line and (ii) a number of sets divided by a number of indices, the same index can be provided to each of the data access modules 140 that could have data for the cache line. The data arrays 136 may then be accessed in parallel data, which may include accessing data in a storage element of each of the data arrays corresponding to the same index. This is illustrated with tasks 224-228.

At 224, the index generation module 126 generates index signals based on the cache line segment ID, the set ID and the one or more way IDs. The one or more way IDs may be used to modify the indices sent to each of the data arrays 136 when the one or more way IDs is known ahead of time. This can occur, for example, during execution of a fill command or an evict command and/or when data is being transferred between memories having different hierarchical levels. As an example, the L0, L1, L2 caches 58, the first memory 54 and the second memory 56 of FIG. 3 may have different hierarchical levels. The memory closest to a processor (e.g., the L0 cache) may have the highest hierarchical level, whereas the memory furthest away from the processor (e.g., the second memory 56) may have the lowest hierarchical level. The control module 52 may include the processor.

The index signals are provided respectively to the data access modules 140. This allows a full cache line to be read or written with a single output port per data array. The index generation module 126 determines which data access module is to access which one of the data arrays 136. As an example and referring to FIG. 5, the one or more commands received at 202 may request the segments of data stored in storage elements of a cache line and indicate that the data is stored in set 1 and way 1. Four index signals may be generated. The segments of the cache line that are stored in the data arrays at set 1 and way 1 have the respective indices identified as $index_5$, $index_4$, $index_7$, and $index_6$.

At 226, the index signals including the indices, for example, $index_5$, $index_4$, $index_7$, and $index_6$ are provided respectively to the data access modules 140. At 228, the data access modules 140 acquire data stored in the storage elements having the corresponding indices as determined at 224 and output data in parallel and/or during the same period of time. Although tasks 224-228 are described with respect to accessing all segments of a cache line, one or more segments of a cache line may be accessed without accessing one or more other segments of the cache line. As an alternative to performing tasks 224-228, the storage elements of the cache line may be accessed serially (one at a time). This may include looking up a way ID for one or more of the data access modules 140 and serially accessing the data for the one or more way IDs via the data access modules 140. The method may end at 232.

The above-described tasks are meant to be illustrative examples; the tasks may be performed sequentially, synchronously, simultaneously, continuously, during overlapping periods of time or in a different order depending upon the application. Also, any of the tasks may not be performed or skipped depending on the implementation and/or sequence of events.

Although the above-disclosed techniques of FIGS. 4-8, primarily describe single and double folding techniques, the number of folding can be increased and/or the degree of folding can be decreased. This can be done, for example, to access smaller segments (i.e. a smaller number of bits per segment) in parallel. Also, the above-disclosed techniques of FIGS. 4-8 can be combined with another storage technique, such as cache banking. A first type of cache banking may include a cache configured such that each array of storage elements includes sub-arrays of storage elements. A second type of cache banking may include duplicating each array of a cache to allow for an increased amount of data to be read out in parallel via logic devices. As an example, the techniques of FIGS. 4-8 may be combined with the first type of cache banking such that an array may include several smaller arrays connected together to perform as a larger array.

At least some of the above-described examples provide parallel cache with circuit area efficiency benefits of serial cache. A decreased amount of logic devices are associated with access modules of the parallel cache while providing same or quicker access times resulting in less power consumed. At least some of the examples allow for access of data when a way ID is not known prior to accessing the corresponding way of a cache line. The above-provided examples provide the access performance associated with using large sized cache lines (e.g., 64 byte cache lines) while providing the circuit area efficiency of small sized cache lines (e.g., 32 byte cache lines).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules.

The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

Although the terms first, second, third, etc. may be used herein to describe various segments, sets, ways, modules, arrays, indices, elements, and/or components, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example implementations.

What is claimed is:

1. An integrated circuit comprising:
    a cache folded a predetermined number of times, wherein the cache comprises a plurality of arrays and a plurality of storage elements, wherein each of the plurality of arrays comprises respective ones of the plurality of storage elements, wherein the plurality of arrays are configured to store a cache line, wherein the cache line comprises a plurality of segments of data, wherein the plurality of segments of data are stored in two or more of the plurality of arrays, and wherein each of the plurality of segments of data is stored in a corresponding one of the plurality of storage elements;
    a first module configured to
        receive a first identifier of one of the plurality of segments of data and a second identifier of a set of the plurality of storage elements, and
        determine an index based on the first identifier and the second identifier; and
    a second module configured to, based on the index, access one or more of the plurality of segments of data from the two or more of the plurality of arrays and output the one or more of the plurality of segments of data.

2. The integrated circuit of claim 1, wherein each of the plurality of segments of data is stored in a respective one of the plurality of storage elements.

3. The integrated circuit of claim 1, wherein:
    the plurality of segments of data are stored respectively in the plurality of arrays; and
    each of the plurality of segments of data is stored in a respective one of the plurality of storage elements.

4. The integrated circuit of claim 1, wherein each of the plurality of segments of data is a word of data.

5. The integrated circuit of claim 1, further comprising:
a plurality of modules configured to receive data respectively from the plurality of arrays, wherein the plurality of modules include the second module;
a third module configured to compare a first tag to a plurality of tags and generate a signal indicating whether the first tag matches one of the plurality of tags;
a fourth module configured to generate a third identifier of a way, wherein the third identifier of the way identifies a group of the plurality of storage elements; and
a multiplexer configured to select one of the plurality of modules based on the third identifier.

6. The integrated circuit of claim 1, further comprising a plurality of modules, wherein the plurality of modules comprise the second module, wherein:
the first module is configured to
receive a plurality of identifiers and a third identifier of a way, wherein the plurality of identifiers include the first identifier and not the third identifier, wherein each of the plurality of identifiers identifies a respective one of the segments of the cache line, wherein each of the segments is stored in a corresponding one of the plurality of arrays, and wherein the third identifier of the way identifies a group of the plurality of storage elements, and
determine a plurality of indices based on the plurality of identifiers and the third identifier, wherein the plurality of indices include the index; and
the plurality of modules are each configured to, based on a respective one of the plurality of indices, output a respective one of the segments of the cache line as received from a respective one of the plurality of arrays.

7. The integrated circuit of claim 1, further comprising a plurality of modules, wherein the plurality of modules comprise the second module, wherein:
the first module is configured to
receive a plurality of identifiers and a third identifier of a way, wherein the plurality of identifiers include the first identifier and not the third identifier, wherein each of the plurality of identifiers identifies a respective one of the segments of the cache line, wherein each of the segments is stored in a respective one of the plurality of arrays, and wherein the third identifier of the way identifies a group of the plurality of storage elements, and
determine a plurality of indices based on the plurality of identifiers and the third identifier, wherein the plurality of indices include the index; and
the plurality of modules are each configured to, based on a respective one of the plurality of indices, output a respective one of the segments of the cache line as received from a respective one of the plurality of arrays.

8. The integrated circuit of claim 1, wherein:
the cache comprises a plurality of groups, wherein each of the plurality of groups comprises two or more of the plurality of storage elements;
each of the plurality of groups has a respective index; and
each of the storage elements in one of the plurality of groups is configured to store a different segment of the cache line than other storage elements in the one of the plurality of groups.

9. The integrated circuit of claim 1, wherein:
each of the plurality of arrays is configured to store data for two or more ways; and
each of the two or more ways identifies a group of the plurality of storage elements.

10. The integrated circuit of claim 1, wherein the cache is folded once such that:
data stored in a first array alternates between a first way and a second way;
data stored in a second array alternates between the second way and the first way; and
each index of the cache stores data for the first way and the second way.

11. The integrated circuit of claim 1, wherein the cache is folded twice such that:
data for a way, a set and a first index is stored in a first array;
data for the way, the set and a second index is stored in a second array; and
data for the way, the set and a third index is stored in a third array.

12. The integrated circuit of claim 11, wherein:
the second index is sequentially after the first index; and
the third index is sequentially after the second index.

13. The integrated circuit of claim 11, wherein storage elements corresponding to each way of the cache are arranged in a helical pattern.

14. A method of accessing a cache, wherein the cache is folded a predetermined number of times, wherein the cache comprises a plurality of arrays and a plurality of storage elements, wherein each of the plurality of arrays comprises respective ones of the plurality of storage elements, wherein the plurality of arrays are configured to store a cache line, wherein the cache line comprises a plurality of segments of data, wherein the plurality of segments of data are stored in two or more of the plurality of arrays, and wherein each of the plurality of segments of data is stored in a corresponding one of the plurality of storage elements, the method comprising:
receiving at a first module a first identifier of one of the plurality of segments of data and a second identifier of a set of the plurality of storage elements;
determining an index of the cache based on the first identifier and the second identifier;
based on the index of the cache, accessing, via a second module, one or more of the plurality of segments of data from the two or more of the plurality of arrays; and
outputting the one or more of the plurality of segments of data.

15. The method of claim 14, further comprising:
receiving, via a plurality of modules, data respectively from the plurality of arrays, wherein the plurality of modules include the second module;
comparing a first tag to a plurality of tags and generating a signal indicating whether the first tag matches one of the plurality of tags;
generating a third identifier of a way, wherein the third identifier of the way identifies a group of the plurality of storage elements; and
selecting one of the plurality of modules based on the third identifier.

16. The method of claim 14, further comprising:
receiving a plurality of identifiers and a third identifier of a way at the first module, wherein the plurality of identifiers include the first identifier and not the third identifier, wherein each of the plurality of identifiers identifies a respective one of the segments of the cache line, wherein each of the segments is stored in a corresponding one of the plurality of arrays, and wherein the third identifier of the way identifies a group of the plurality of storage elements;
determining a plurality of indices based on the plurality of identifiers and the third identifier, wherein the plurality of indices include the index of the cache; and based on a respective one of the plurality of indices, via each of a plurality of modules including the second module, outputting a respective one of the segments of the cache line as received from a respective one of the plurality of arrays.

17. The method of claim 14, wherein the cache is folded once such that:
data stored in a first array alternates between a first way and a second way;
data stored in a second array alternates between the second way and the first way; and
each index of the cache stores data for the first way and the second way.

18. The method of claim 14, wherein the cache is folded twice such that:
data for a way, a set and a first index is stored in a first array;
data for the way, the set and a second index is stored in a second array; and
data for the way, the set and a third index is stored in a third array.

19. The method of claim 18, wherein:
the second index is sequentially after the first index; and
the third index is sequentially after the second index.

20. The method of claim 18, wherein storage elements corresponding to each way of the cache are arranged in a helical pattern.

* * * * *